(12) United States Patent
Ebeling et al.

(10) Patent No.: US 8,454,884 B2
(45) Date of Patent: *Jun. 4, 2013

(54) METHOD OF PRODUCING CELLULOSE CARBAMATE BLOWN FILM AND USE OF THE SAME

(75) Inventors: Horst Ebeling, Premnitz (DE); Hans-Peter Fink, Teltow (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 870 days.

This patent is subject to a terminal disclaimer.

(21) Appl. No.: 12/419,989

(22) Filed: Apr. 7, 2009

(65) Prior Publication Data
US 2009/0259032 A1 Oct. 15, 2009

(30) Foreign Application Priority Data
Apr. 14, 2008 (DE) .................. 10 2008 018 745

(51) Int. Cl.
*B29C 47/00* (2006.01)

(52) U.S. Cl.
USPC ........................... 264/561; 264/572; 264/187

(58) Field of Classification Search
USPC ......................... 264/561, 572, 187
See application file for complete search history.

(56) References Cited

U.S. PATENT DOCUMENTS

| | | |
|---|---|---|
| 3,767,756 A | 10/1973 | Blades |
| 3,833,438 A | 9/1974 | Kaneko et al. |
| 4,144,080 A | 3/1979 | McCorsley, III |
| 4,404,369 A | 9/1983 | Huttunen et al. |
| 5,216,144 A | 6/1993 | Eichinger et al. |
| 5,607,639 A | 3/1997 | Zikeli et al. |
| 5,968,433 A | 10/1999 | Belch et al. |
| 6,113,842 A | 9/2000 | Weigel et al. |
| 6,590,095 B1 | 7/2003 | Schleicher et al. |
| 2008/0023874 A1 | 1/2008 | Fink et al. |
| 2008/0287025 A1 | 11/2008 | Ebeling et al. |

FOREIGN PATENT DOCUMENTS

| | | |
|---|---|---|
| DE | 2830685 A1 | 2/1979 |
| DE | 4421482 A1 | 12/1995 |
| DE | 102005029793 A1 | 12/1996 |
| DE | 19757958 A1 | 7/1999 |
| DE | 102004007616 A1 | 9/2005 |
| DE | 102004031025 B3 | 12/2005 |
| EP | 0057105 A2 | 8/1982 |
| EP | 0178292 A2 | 4/1986 |
| EP | 0490870 A2 | 6/1992 |
| EP | 0662283 A2 | 7/1995 |
| EP | 0879906 A2 | 11/1998 |
| EP | 0920548 B1 | 10/2002 |
| WO | WO 95/07811 A1 | 3/1995 |
| WO | WO 95/35340 A1 | 12/1995 |
| WO | WO 2006/000197 A1 | 1/2006 |
| WO | WO 2007/000319 A1 | 1/2007 |
| WO | WO 2007/026886 A1 | 3/2007 |

OTHER PUBLICATIONS

Barthel et al., "Acylation and carbanilation of cellulose in ionic liquids," *Green Chemistry*, 8: 301-306 (2006).
Hu et al., "Ionische Flüssigkeit in der Synthese von Cellulose carbamat", (Synthesis of Cellulos Carbamate in Ionic Liquid), Lederchemikalien, vol. 24, No. 3, pp. 31-35 (2007)—abstract only.
Laus et al., "Ionic Liquids: Current Developments, Potential and Drawbacks for Industrial Applications", Lenzinger Berichte, 84, pp. 71-85 (2005).
Zhang, "Zellulose Lösungsmittel Progress" (Advances in Solvents of Cellulose), Polymer Journal 10 (2007)—abstract only.

*Primary Examiner* — James Sanders
(74) *Attorney, Agent, or Firm* — Leydig, Voit & Mayer, Ltd.

(57) ABSTRACT

The present invention relates to a cellulose carbamate spinning solution, the cellulose carbamate being dissolved in at least one ionic liquid. Furthermore, the invention relates to a method for the production of blown films in which a solution of cellulose carbamate in an ionic liquid is extruded into a coagulation bath, and also to the films produced with the method and the use thereof.

12 Claims, No Drawings

METHOD OF PRODUCING CELLULOSE CARBAMATE BLOWN FILM AND USE OF THE SAME

CROSS-REFERENCE TO RELATED APPLICATIONS

This patent application claims the benefit of DE 10 2008 018 745.3, filed Apr. 14, 2008, which is incorporated by reference.

The present invention relates to a cellulose carbamate spinning solution, the cellulose carbamate being dissolved in at least one ionic liquid. Furthermore, the invention relates to a method for the production of blown films in which a solution of cellulose carbamate in an ionic liquid is extruded into a coagulation bath, and also to the films produced with the method and the use thereof.

Currently significant quantities of products, such as fibres, films, nonwovens and other moulded articles, are produced worldwide from regenerated cellulose, predominantly according to the viscose method. Since the viscose method is associated with significant environmental impact, e.g. due to carbon disulphide, hydrogen sulphide, heavy metals, and also with high investment costs, efforts have already been made for years to replace the viscose method by alternative methods. Methods have been developed on the basis of direct dissolving of pulp in a suitable solvent or alternative derivatisation variants without carbon disulphide.

One method (TENCEL®) introduced for the production of cellulose fibres is the spinning of solutions of cellulose in amine oxides, preferably in N-methylmorpholine-N-oxide (NMMO), not least because by means of this the complex route via derivatisation of the cellulose is avoided. It is known from DE 28 30 685 and U.S. Pat. No. 3,767,756 and also EP 0 490 870 that cellulose is soluble in an NMMO water system and can be processed to form textile fibres by spinning in a generally aqueous NMMO solution.

The production of cellulose films by extrusion of a solution of cellulose in NMMO into a coagulation bath and also the films produced with this method and the use thereof are the subject of the inventions described in DE 44 21 482 and EP 0 662 283.

A further known possibility for the production of moulded articles made of regenerated cellulose resides in precipitating a solution of cellulose carbamate (EP 57 105, EP 178 292) which is formed by conversion of cellulose with urea. Cellulose carbamate is soluble in cold sodium hydroxide solution and can be regenerated again into cellulose in heated sodium hydroxide solution.

The low solids concentration of the cellulose in the spinning solution which is generally 8 to 15% is disadvantageous for the productivity of the described cellulose wet spinning methods.

The use of concentrations above 20% for the production of cellulose fibres on the basis of extrusion of solutions of cellulose carbamate in NMMO is described in DE 10 2004 007 616. In this method, the high spinning solution viscosities have a disadvantageous effect. The spinning solution production is effected by swelling the cellulose carbamate in a 40 to 70% mixture comprising NMMO and water and subsequent distilling-off of water, which demands significant dissolving times and a fairly high energy requirement.

Ionic liquids have been described as a further solvent for cellulose in recent times. Ionic liquids are salts which are constructed from a cyclic, generally nitrogen-containing cation and an organic or inorganic anion and have a melting point below 100° C. Possibilities for synthesis of ionic liquids, the use as medium in chemical reactions and also as solvents for cellulose and also the formation of these solutions into fibres are described in the subsequently mentioned publication (G. Laus, G. Bentivoglio, H. Schottenberger, V. Kahlenberg, H. Kopacka, T. Röder, H. Sixta, "Ionic Liquids: Current Developments, Potential and Drawbacks for Industrial Applications" in Lenzinger Berichte, 84 (2005) 71-85).

In WO 2006/000197, a method and device for the production of moulded articles from solutions of cellulose in ionic liquids are described. The pulps are disintegrated here in water and supplied to the dissolving process in wet form. This means that the water must be removed during dissolving, as a result of which the dissolving time and the energy requirement are affected. The described spinning solutions with concentrations up to 20% have very high zero shear viscosities.

Starting herefrom, it was the object of the present invention to provide a cellulose carbamate spinning solution in which the cellulose carbamate is present in high concentrations in dissolved form. It was also the object of the present invention to provide an environmentally friendly method for the production of qualitatively high-quality cellulose carbamate blown films, which method fulfils the demands with respect to low investment and production costs due to high solution concentrations. Further objects of the invention are to provide a correspondingly produced blown film and also to indicate possibilities for using the blown film.

This object preferably is achieved by the characterizing features of the present invention. Advantageous embodiments and further developments of the invention will be apparent from the description of the invention provided herein.

According to the invention, a spinning solution made of cellulose carbamate is hence provided, the cellulose carbamate being dissolved in at least one ionic liquid. According to the invention, the cellulose carbamate concentration of the spinning solution is thereby at least 15% by weight and the zero shear viscosity, measured at 100° C., is thereby in a range of 50 to 7,500 Pa s.

It was shown surprisingly that cellulose carbamate dissolves in ionic liquids up to high concentrations and can be shaped to form blown films with high strengths. It was likewise shown surprisingly that the highly-concentrated solutions, compared to cellulose in ionic liquids and also to cellulose carbamate in NMMO, have far lower zero shear viscosities at the processing temperature.

For the production of the spinning solution according to the invention, cellulose carbamate is dissolved in an ionic liquid with agitation or kneading at temperatures above 80° C. and the resulting spinning solution is filtered.

Preferably, dried cellulose carbamate is used for production of the spinning solution and the spinning solution is formed by mechanical mixing at temperatures between 80 and 120° C., preferably between 90 and 100° C. When using water-containing cellulose carbamate, the dissolving is effected by kneading with simultaneous withdrawal of the water at reduced pressure, e.g. less than 0.9 bar.

In an advantageous embodiment, the melting point of the at least one ionic liquid is below 100° C., preferably below 75° C., particularly preferred below 50° C.

The at least one ionic liquid is thereby selected preferably from the group consisting of ammonium-, pyrazolium-, cholinium-, in 1- and 3-position alkyl- or aryl-substituted imidazolium compounds and/or mixtures hereof, in particular butyl methylimidazolium acetate, butyl methylimidazolium chloride, ethyl methylimidazolium chloride, ethyl methylimidazolium acetate, butyl ethylimidazolium acetate, butyl ethylimidazolium chloride, methyl tetradecylimidazolium chloride, butyl methylimidazolium bromide, butyl methylpyridinium chloride, butyl methylimidazolium thiocyanate, ethyl methylimidazolium thiocyanate, butyl ethylimidazolium thiocyanate, hexyl dimethylimidazolium hexafluoroborate, ethoxy methyl methylpyrrolidinium chloride, hydroxypropyl methylimidazolium acetate, hydroxypropyl methylimidazolium chloride and/or butyl methylpyridinium chloride.

Further advantages are produced if the cellulose carbamate has a $DP_{cuoxam}$ of 150 to 170, preferably of 250 to 550.

It is likewise preferred if the cellulose carbamate has a substitution degree $DS_{carbamate}$ of 0.1 to 1, preferably of 0.2 to 0.6.

It must be emphasised as a particular advantage of the present invention that high concentrations of cellulose carbamate in solution can be set by dissolving the cellulose carbamate in an ionic liquid. The cellulose carbamate concentration can thus assume high concentration values, advantageously between 20 and 50% by weight, further preferred between 20 and 40% by weight, particularly preferred between 20 and 30% by weight.

Further advantages of the spinning solution according to the invention can be seen in the fact that, despite the high cellulose carbamate content, low zero shear viscosities are produced. Preferred ranges of the zero shear viscosity, measured at 100° C., are thereby in the range of 50 to 5,000 Pa s, preferably of 150 to 2,500 Pa s and particularly preferred of 250 to 1,250 Pa s.

According to the invention, a method for the production of a cellulose carbamate blown film is likewise provided, the spinning solution according to the invention being extruded into a coagulation bath via a film-blowing nozzle and also, subsequent thereto, an outer air gap.

The spinning solution is preferably filtered before extrusion and pressed vertically into the coagulation bath through the outer air gap. By varying the withdrawal speed and also the inflation ratio, the stretch ratios in the longitudinal and transverse direction are adjusted.

In a further advantageous embodiment, an aqueous solution at least of one ionic liquid is used as coagulation bath. The weight concentration of the at least one ionic liquid in the aqueous solution is preferably here from 0.5 to 50% by weight, preferably from 2 to 25% by weight.

The temperature of the spinning solution during extrusion is preferably from 50 to 150° C., further preferred from 80 to 120° C.

The invention relates furthermore to the films which are produced with this method and are distinguished in particular in that they have high strengths in the longitudinal and transverse direction.

The films produced according to this method, as a function of the coagulation conditions applied, have a nitrogen content of 0.1 to 7%, preferably of 0.5 to 5%.

The blown films according to the invention are likewise distinguished by an advantageous strength and also by an advantageous breaking elongation. In particular, the strength (longitudinally) is hereby 250 to 750 MPa and/or (transversely) 75 to 350 MPa, the strength (transversely) tending therefore to be less than the strength (longitudinally).

In addition, the advantageous breaking elongation (longitudinally) is 8 to 30% and/or (transversely) 15 to 50%, the breaking elongation (transversely) tending here to be greater than the breaking elongation (longitudinally).

Furthermore, the blown film is characterised by an advantageous modulus of elasticity (longitudinally) between 5,000 and 20,000 MPa and/or a modulus of elasticity (transversely) between 1,000 and 6,000 MPa.

Furthermore, the invention relates to the use of the blown film according to the invention, for example as a biodegradable and/or compostible packaging material, as sausage skin and/or as membrane for material separation, e.g. in water purification.

The subject according to the invention is intended to be explained in more detail with reference to the subsequent examples without wishing to restrict the latter to the special embodiments shown here.

EXAMPLES

Example 1

200 g cellulose carbamate (DPcuox: 258, DS 0.4) are mixed with 800 g butyl methylimidazolium acetate and dissolved in a horizontal kneader at 110° C. within 1 hour. The resulting homogeneous, dark brown solution is completely fibre-free. The viscosity of the solution, measured at 100° C., is 64 Pa s.

The solution is extruded with a controlled gear-type pump through a film-blowing nozzle with a diameter of 25 mm at a temperature of 100° C., downwards through an outer air gap of 3 mm width with a drawing of 1:5 and a transverse stretch ratio of 1:1 into a coagulation bath of the composition 12% butyl methylimidazolium acetate/88% deionised water. The formed tube is guided out of the coagulation bath via a deflection roller, the solvent is washed out completely and dried.

The resulting film has the following parameters:

| | |
|---|---|
| Thickness: | 95 μm |
| Strength, longitudinally: | 325 MPa |
| Strength, transversely: | 156 MPa |
| Breaking elongation, longitudinally: | 12% |
| Breaking elongation, transversely: | 29% |
| Modulus of elasticity, longitudinally: | 11,200 MPa |
| Modulus of elasticity, transversely: | 2,400 MPa |

Example 2

300 g cellulose carbamate (DPcuox: 258, DS 0.4) are mixed with 700 g butyl methylimidazolium acetate and dissolved in a horizontal kneader at 110° C. within 2 hours. The resulting homogeneous, dark brown solution is completely fibre-free. The viscosity of the solution, measured at 100° C., is 1,210 Pa s.

The solution is extruded with a controlled gear-type pump through a film-blowing nozzle with a diameter of 25 mm at a temperature of 100° C., downwards through an outer air gap of 3 mm width with a drawing of 1:8 and a transverse stretch ratio of 1:1 into a coagulation bath of the composition 12% butyl methylimidazolium acetate/88% deionised water. The formed tube is guided out of the coagulation bath via a deflection roller, the solvent is washed out completely and the tube is dried.

The resulting film has the following parameters:

| | |
|---|---|
| Thickness: | 90 μm |
| Strength, longitudinally: | 557 MPa |
| Strength, transversely: | 236 MPa |
| Breaking elongation, longitudinally: | 10% |

-continued

| | |
|---|---|
| Breaking elongation, transversely: | 22% |
| Modulus of elasticity, longitudinally: | 14,200 MPa |
| Modulus of elasticity, transversely: | 3,600 MPa |

The invention claimed is:

1. A method of producing a cellulose carbamate blown film, comprising
   (a) extruding a spinning solution into a coagulation bath via a film-blowing nozzle, wherein the spinning solution is a cellulose carbamate spinning solution comprising a solution of cellulose carbamate in at least one ionic liquid, wherein the cellulose carbamate concentration of the spinning solution is at least 15% by weight and a zero shear viscosity, measured at 100° C., is in the range of 50 to 7,500 Pa s;
   (b) subsequently extruding the spinning solution through an outer air gap; and
   (c) wherein an aqueous solution of at least one ionic liquid is used in the coagulation bath.

2. The method of claim 1, wherein the weight concentration of the at least one ionic liquid in the aqueous solution is from 0.5 to 50% by weight.

3. The method of claim 1, wherein the temperature of the spinning solution is from 50 to 150° C.

4. The method of claim 1, wherein the ionic liquid has a melting point below 100° C.

5. The method of claim 1, wherein the ionic liquid is selected from the group consisting of ammonium-compounds, pyrazolium-compounds, cholinium-compounds, in 1- and 3-position alkyl- or aryl-substituted imidazolium compounds, and mixtures thereof.

6. The method of claim 5, wherein the ionic liquid is selected from the group consisting of butyl methylimidazolium acetate, butyl methylimidazolium chloride, ethyl methylimidazolium chloride, ethyl methylimidazolium acetate, butyl ethylimidazolium acetate, butyl ethylimidazolium chloride, methyl tetradecylimidazolium chloride, butyl methylimidazolium bromide, butyl methylpyridinium chloride, butyl methylimidazolium thiocyanate, ethyl methylimidazolium thiocyanate, butyl ethylimidazolium thiocyanate, hexyl dimethylimidazolium hexafluoroborate, ethoxy methyl methylpyrrolidinium chloride, hydroxypropyl methylimidazolium acetate, hydroxypropyl methylimidazolium chloride, butyl methylpyridinium chloride, and mixtures thereof.

7. The method of claim 1, wherein the cellulose carbamate has a $DP_{cuoxam}$ of 150 to 750.

8. The method of claim 1, wherein the cellulose carbamate has a substitution degree $DS_{carbamate}$ of 0.1 to 1.

9. The method of claim 1, wherein the cellulose carbamate concentration is between 20 and 50% by weight.

10. The method of claim 1, wherein dried cellulose carbamate is used for the production of the spinning solution.

11. The method of claim 1, wherein water-containing cellulose carbamate is used for the production of the spinning solution and the dissolving process is implemented at a reduced pressure of less than 0.9 bar.

12. The method of claim 1, wherein the zero shear viscosity, measured at 100° C., is in the range of 50 to 5,000 Pa s.

* * * * *